(12) United States Patent
Jami et al.

(10) Patent No.: US 8,964,649 B2
(45) Date of Patent: *Feb. 24, 2015

(54) CONFIGURABLE RANDOM ACCESS CHANNEL STRUCTURE FOR RANGE EXTENSION IN A WIRELESS COMMUNICATION SYSTEM

(71) Applicant: Alcatel-Lucent USA Inc., Murray Hill, NJ (US)

(72) Inventors: Iqbal Jami, Swindon (GB); Jung Ah Lee, Pittstown, NJ (US); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,565

(22) Filed: Feb. 19, 2014

(65) Prior Publication Data
US 2014/0169303 A1 Jun. 19, 2014

Related U.S. Application Data

(63) Continuation of application No. 12/671,553, filed as application No. PCT/US2007/072360 on Jun. 28, 2007, now Pat. No. 8,693,412.

(60) Provisional application No. 60/919,080, filed on Mar. 20, 2007.

(51) Int. Cl.
*H04W 16/24* (2009.01)
*H04W 74/00* (2009.01)
(Continued)

(52) U.S. Cl.
CPC .............. *H04W 74/00* (2013.01); *H04W 16/24* (2013.01); *H04W 74/004* (2013.01); *H04W 74/0833* (2013.01); *H04W 74/0866* (2013.01); *H04W 84/04* (2013.01)
USPC ........................................... 370/328; 455/450

(58) Field of Classification Search
USPC ................. 370/252, 328, 329, 344, 470, 480; 455/450
See application file for complete search history.

(56) References Cited

U.S. PATENT DOCUMENTS

2007/0171889 A1    7/2007   Kwon et al.
2007/0291696 A1   12/2007   Zhang et al.
(Continued)

FOREIGN PATENT DOCUMENTS

WO    00/21320    4/2000
WO    02/39622    5/2002

OTHER PUBLICATIONS

International Search Report and Written Opinion correlating to PCT/US2007/072360 dated Feb. 11, 2008, 6 pages.
(Continued)

*Primary Examiner* — Paul H Masur
(74) *Attorney, Agent, or Firm* — Davidson Sheehan LLP (57) ABSTRACT

The present invention provides a method involving a configurable random access channel structure. One embodiment of the method includes generating a random access channel burst that includes a cyclic prefix and a selected number of repetitions of a preamble. The number of repetitions is selected based on at least one of a cell radius and a radio transmission frequency. This embodiment of the method also includes transmitting the random access channel burst over an air interface.

68 Claims, 8 Drawing Sheets

(51) Int. Cl.
*H04W 74/08* (2009.01)
*H04W 84/04* (2009.01)

(56) References Cited

U.S. PATENT DOCUMENTS

| | | |
|---|---|---|
| 2008/0165903 A1 | 7/2008 | Hooli et al. |
| 2010/0034155 A1 | 2/2010 | Noh et al. |
| 2010/0054235 A1 | 3/2010 | Kwon et al. |

OTHER PUBLICATIONS

"RACH Design Issues of Large Cell Deployment", 3rd Generation Partnership Project (3GPP), vol. TSG RAN WG1 Meeting #46bis, Oct. 13, 2006, 6 pages.

"Random Access Burst Design for E-UTRA", 3rd Generation Partnership Project (3GPP), vol. TSG-RAN WG1 Meeting #46, Aug. 28, 2006, 9 pages.

"RACH Sequence Design Based on Repetition Method", 3rd Generation Partnership Project (3GPP), vol. TSG RAN1 LTE WG1 Meeting #46bis, Oct. 9, 2006, 8 pages.

Lge, "RACH Sequence Extension Methods for Large Cell Deployment", 3rd Generation Partnership Project (3GPP), vol. TSG RAN1 LTE WG1 Meeting #46, Aug. 28, 2006, 7 pages.

"Multi-TTI RACH Preamble Design", 3rd Generation Partnership Project (3GPP), vol. TSG RAN WG1 Meeting #48, Feb. 12, 2007, 5 pages.

Panasonic, NTT DoCoMo, "Non-synchronized RACH Preamble Structure for High Mobility UE", 3rd Generation Partnership Project (3GPP), vol. TSG-RAN WG1 Meeting #47bis, Jan. 15, 2007, 11 pages.

Motorola "Summary of Random Access E-mail Reflector Discussion," 3rd Generation Partnership Project (3GPP), vol. TSG-RAN1, No. 47. Nov. 6, 2006, 6 pages.

Ericsson, "E-UTRA Scalability of Random Access Preamble with Cyclic Prefix," 3rd Generation Partnership Project (3GPP), vol. TSG-RAN WG1 LTE, Jun. 27, 2006, 8 pages.

Chinese Office Action mailed Sep. 3, 2013 for U.S. Appl. No. 12/671,553, 5 pages.

Motorola, "Non-Synchronized Random Access", 3rd Generation Partnership Project (3GPP), vol. TSG RAN#47-bis, Jan. 15, 2007, 5 pages.

CONFIGURABLE RANDOM ACCESS CHANNEL STRUCTURE FOR RANGE EXTENSION IN A WIRELESS COMMUNICATION SYSTEM

CROSS REFERENCE TO RELATED APPLICATIONS

This application is a continuation of U.S. patent application Ser. No. 12/671,553, filed on Jun. 14, 2010, which issued as U.S. Pat. No. 8,693,412 and which claims priority to PCT Application PCT/US2007/72360, which claims priority to Provisional Application 60/919,080. The entirety of each of these applications is incorporated by reference as if fully set forth herein.

BACKGROUND OF THE INVENTION

1. Field of the Invention

This invention relates generally to processor-based systems, and, more particularly, to arbitrating bus transactions in processor-based systems.

2. Description of the Related Art

Wireless communication systems typically include one or more base stations or access points for providing wireless connectivity to mobile units in a geographic area (or cell) associated with each base station or access point. Mobile units and base stations communicate by transmitting modulated radiofrequency signals over a wireless communication link, or air interface. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like. The uplink and downlink channels may be shared or dedicated.

Mobile units can initiate communication with the base station by transmitting a message on one or more of the random access channels (RACHs). Uplink random access messages are non-synchronized and therefore may be transmitted at any time based on the synchronized downlink timing by any mobile unit within the coverage area of the base station. The receiver in the base station must therefore continuously monitor the random access channels and search the signals received on the random access channels for predetermined sequences of symbols (sometimes referred to as the RACH preamble) in random access messages transmitted by mobile units. To make the search process feasible, the format of the random access messages must be standardized. For example, conventional random access messages in the Universal Mobile Telecommunication Services (UMTS) Long Term Evolution (LTE) system are transmitted in a subframe during a transmission time interval (TTI) of 1 ms in 1.08 MHz bandwidth. The random access messages subframe is divided into a 0.8 ms preamble and a 102.6 µs cyclic prefix that includes a copy of a portion of the sequence of symbols in the preamble. The remaining 97.4 µs in the transmission time interval is reserved as a guard time to reduce or prevent inter-symbol interference between different random access messages or shared data channels.

The coverage area of a base station is related to the duration of the cyclic prefix and the guard time. For example, the conventional guard time of approximately 0.1 ms corresponds to a round-trip delay for a signal that travels approximately 15 kilometers. Thus, a random access channel message format that includes approximately 0.1 ms for the guard time is appropriate for reducing or preventing inter-symbol interference for coverage areas or cell sizes having a radius of up to approximately 15 kilometers. Similarly, the duration of the cyclic prefix is related to the size of the coverage area and the propagation channel delay spread. For example, a cyclic prefix of approximately 0.1 ms is suitable for coverage areas having radii of up to approximately 15 kilometers. Although a range of 15 km may be considered sufficient for conventional wireless communication systems, the base station range of proposed wireless communications systems, such as the UMTS LTE, is expected to increase to at least 100 km. Proposals to extend the range of the random access channel supported by base stations include increasing the transmission time interval to 2 ms.

Figure 1:
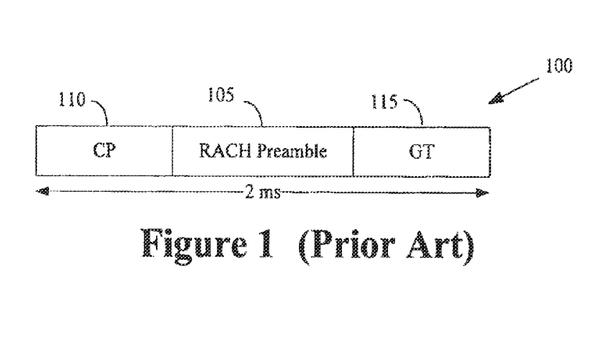
FIG. 1 shows a proposed modification to a random access message.

FIG. 1 shows a proposed modification to a random access message 100. In this proposal, the extended transmission time interval includes a 0.8 ms RACH preamble 105. The length of the cyclic prefix (CP) 110 increases in proportion to the desired coverage area. For example, every 0.1 ms of additional cyclic prefix length will account for additional 15 km coverage. The guard time 115 also increases at the same rate as the cyclic prefix length. Thus, with the 0.8 ms RACH preamble, the time available for guard time and cyclic prefix is 2 ms−0.8 ms=1.2 ms. This RACH range extension proposal attempts to reduce the receiver complexity of the RACH preamble detection. However, the range is then extended at the expense of the increased overhead required to transmit the longer cyclic prefix.

Figure 2:
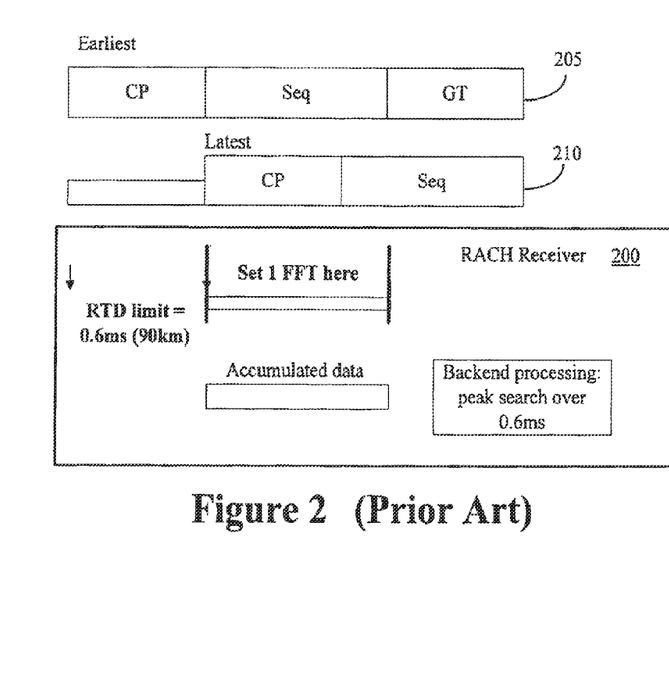
FIG. 2 conceptually illustrates one conventional RACH receiver.

FIG. 2 conceptually illustrates one conventional RACH receiver 200. The receiver 200 monitors signals received within the 2 ms transmission time interval of the random access channel. If the mobile unit is very close to the receiver 200, then the subframe may begin very near the beginning of the transmission time interval, as indicated by the subframe 205. However, if the mobile unit is near the edge of the coverage area of the base station, then the subframe may begin very late in the transmission time interval, as indicated by the subframe 210. A conventional preamble detection scheme may be used in this range extension scenario by shifting the starting reference time to the end of extended cyclic prefix, e.g., by shifting the Fast Fourier Transform data collection window by 0.6 ms for a 90 km coverage area, as shown in FIG. 2. The accumulated data can then be processed to search for a peak over a delay of approximately 0.6 ms.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for configuring a random access channel structure. One embodiment of the method includes generating a random access channel burst including a cyclic prefix and a selected number of repetitions of a preamble. This embodiment of the method also includes transmitting the random access channel burst over an air interface. Another embodiment of the method includes receiving a signal including information indicative of a random access channel burst including a cyclic prefix and a selected number of repetitions of a preamble. This embodiment of the method also includes detecting a mobile unit that transmitted the random access channel burst based on the received signal. The number of repetitions of the preamble is selected based on at least one of a cell radius and a radio transmission frequency.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 3:
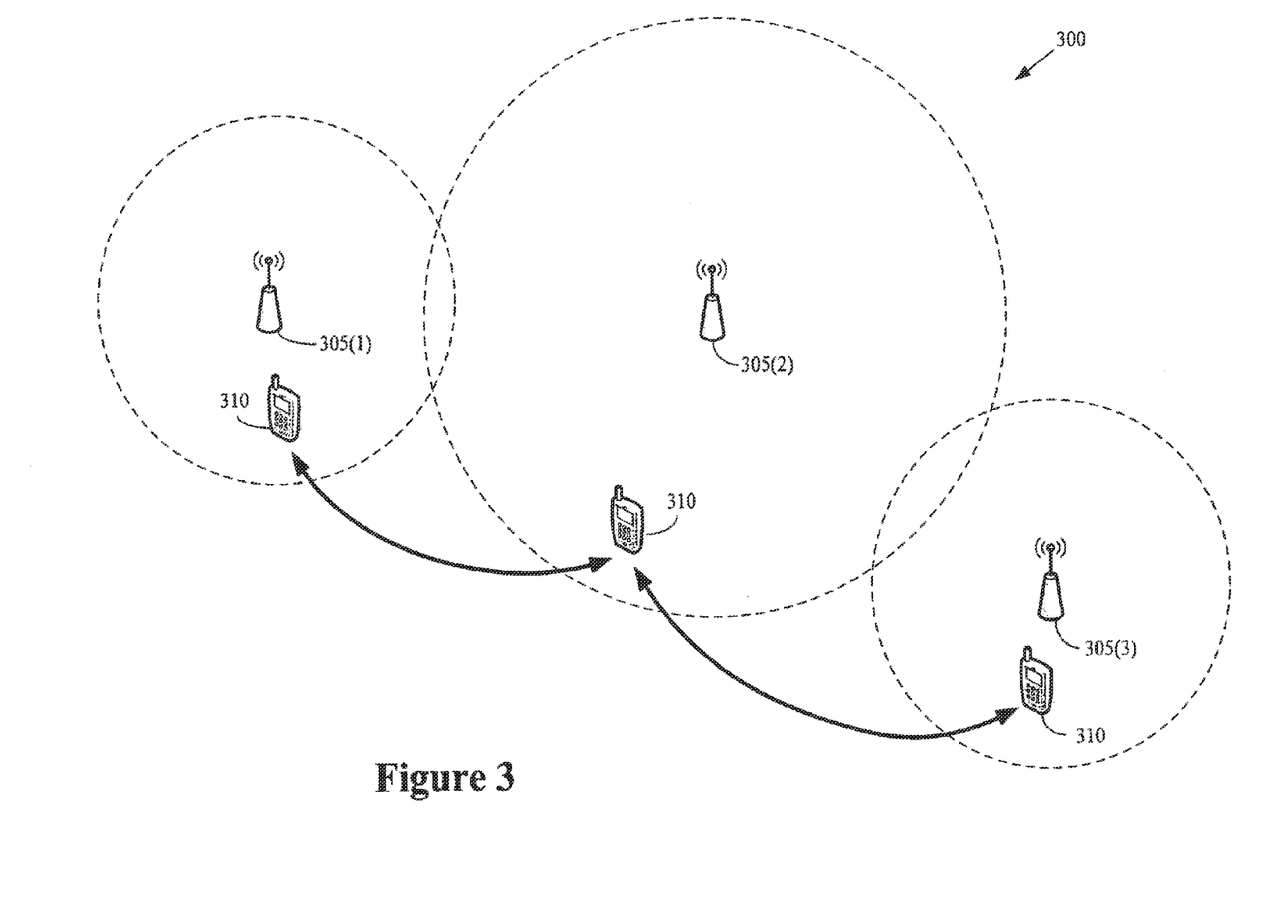
FIG. 3 conceptually illustrates one exemplary embodiment of a wireless communication system, in accordance with the present invention.

FIG. 3 conceptually illustrates one exemplary embodiment of a wireless communication system 300. In the illustrated embodiment, the wireless communication system 300 includes base stations 305(1-3) for providing wireless connectivity to one or more mobile units 310. The indices (1-3) may be dropped when referring to the base stations 305 collectively. The base stations 305 may provide wireless connectivity according to various standards and/or protocols, including Orthogonal Frequency Division Multiplexing (OFDM). However, persons of ordinary skill in the art having benefit of the present disclosure should appreciate that alternative embodiments of the wireless communication system 300 may include base stations 305 that operate according to different standards and/or protocols. Furthermore, techniques for providing wireless connectivity to mobile units 310 are known in the art and in the interest of clarity only those aspects of providing wireless connectivity that are relevant to the present invention will be discussed herein.

The base stations 305 may be configured to provide wireless connectivity over different ranges and/or using different frequency bands. In the illustrated embodiment, the base station 305(1) is configured to provide wireless connectivity over a range of approximately 45 km in one or more selected frequency bands, e.g. at carrier frequencies of 450 MHz or 900 MHz. The base station 305(2) is configured to provide wireless connectivity over a range of approximately 75 km using the same frequency bands as the base station 305(1). The base station 305(3) is configured to provide wireless connectivity over a range of approximately 45 km in a different set of frequency bands, e.g. at carrier frequencies of 2.1 GHz or 2.6 GHz. Persons of ordinary skill in the art having benefit of the present disclosure should appreciate that the configurations of the base stations 305 described above are intended to be illustrative and not to limit the present invention.

The mobile unit 310 can initiate communication with the base stations 305 by transmitting a message on one or more random access channels (RACHs). The format of the random access channel burst transmitted by the mobile unit 310 may be selected based upon the radius or range associated with one or more of the base stations 305. In the illustrated embodiment, the mobile unit 310 initially selects a default format for the random access channel burst. For example, the mobile unit 310 may be configured to generate and transmit random access channel bursts in a subframe during a transmission time interval (TTI) of 1 ms in 1.08 MHz bandwidth. The random access messages subframe is divided into a 0.8 ms preamble and a 102.6 µs cyclic prefix that includes a copy of a portion of the sequence of symbols in the preamble. The remaining 97.4 µs in the transmission time interval is reserved as a guard time to reduce or prevent inter-symbol interference between different random access messages. This particular format may be suitable for communication with a base station (not shown) that is configured to provide wireless connectivity over a range of approximately 15 km in one or more selected frequency bands, e.g. at carrier frequencies of 450 MHz or 900 MHz.

When the mobile unit 310 moves within range of the base station 305(1), it may receive a broadcast message from the base station 305(1) indicating a modified format for the random access channel bursts. In the illustrated embodiment, the range of the base station 305(1) is an extended range of approximately 45 km. Accordingly, the format of the random access channel bursts may be modified so that the preamble is repeated once, i.e. the preamble is transmitted twice in the random access channel burst. In one embodiment, the format of the random access channel bursts may also be modified so that the random access channel burst occupies more than one subframe. When the mobile unit 310 moves within range of the base station 305(2), it may receive a broadcast message from the base station 305(2) indicating a modified format for the random access channel bursts. In the illustrated embodiment, the range of the base station 305(2) is an extended range of approximately 75 km. Accordingly, the format of the random access channel bursts may be modified so that the preamble is repeated twice. The format of the random access channel bursts may also be modified so that the random access channel bursts occupies three subframes.

The format of the random access channel bursts transmitted by the mobile unit 310 may also be modified based on the frequency bands used by the base stations 305. In the illustrated embodiment, the mobile unit 310 may move from an area served by the base station 305(1) to an area served by the base station 305(3). Although the base stations 305(1, 3) have approximately the same range, the base station 305(3) transmits at a higher carrier frequency range than the base station 305(1). Propagation conditions for lower carrier frequencies (such as 450 MHz or 900 MHz) may be significantly better than for higher carrier frequencies (such as 2.1 GHz or 2.6 GHz). Accordingly, the base station 305(3) may transmit a broadcast message indicating that the format of the random access channel bursts may be modified so that the preamble is repeated twice or more. The broadcast message may also indicate that the format of the random access channel bursts may be modified so that the random access channel bursts occupies three or more subframes.

The duration of the cyclic prefix and/or the guard time interval may also be modified. In one embodiment, the duration of the cyclic prefix may remain the same for the different formats used by the base stations 305 and the guard time interval may occupy the portion of the subframe (or subframes) that is not used by the cyclic prefix or the preambles. In alternative embodiments, other partitions between cyclic prefix and guard period can be envisioned: In one case, the 1.2 ms portion of the subframe that is not allocated to the preamble could be evenly allocated to the cyclic prefix and the guard time so that the RACH coverage is extended to 90 km as shown in FIG. 2. Alternatively, the 1.2 ms portion of the subframe that is not allocated to the preamble could be unevenly distributed between the cyclic prefix length and the guard time. The uneven distribution of the allocated time to the cyclic prefix and the guard time could extend the coverage to the 100 km if the cyclic prefix length is equal to or greater than 0.667 ms. However, inter-symbol interference may occur when the cyclic prefix and guard time allocations are uneven in cases where the preamble is transmitted by a mobile unit near the cell edge. Furthermore, the signal strength received from mobile units near the edge of an extended cell, e.g. mobile units that are as much as 90 or 100 km from the base station, may be very low, which may reduce the likelihood of detecting the preamble of the random access channel message.

Figure 4A:
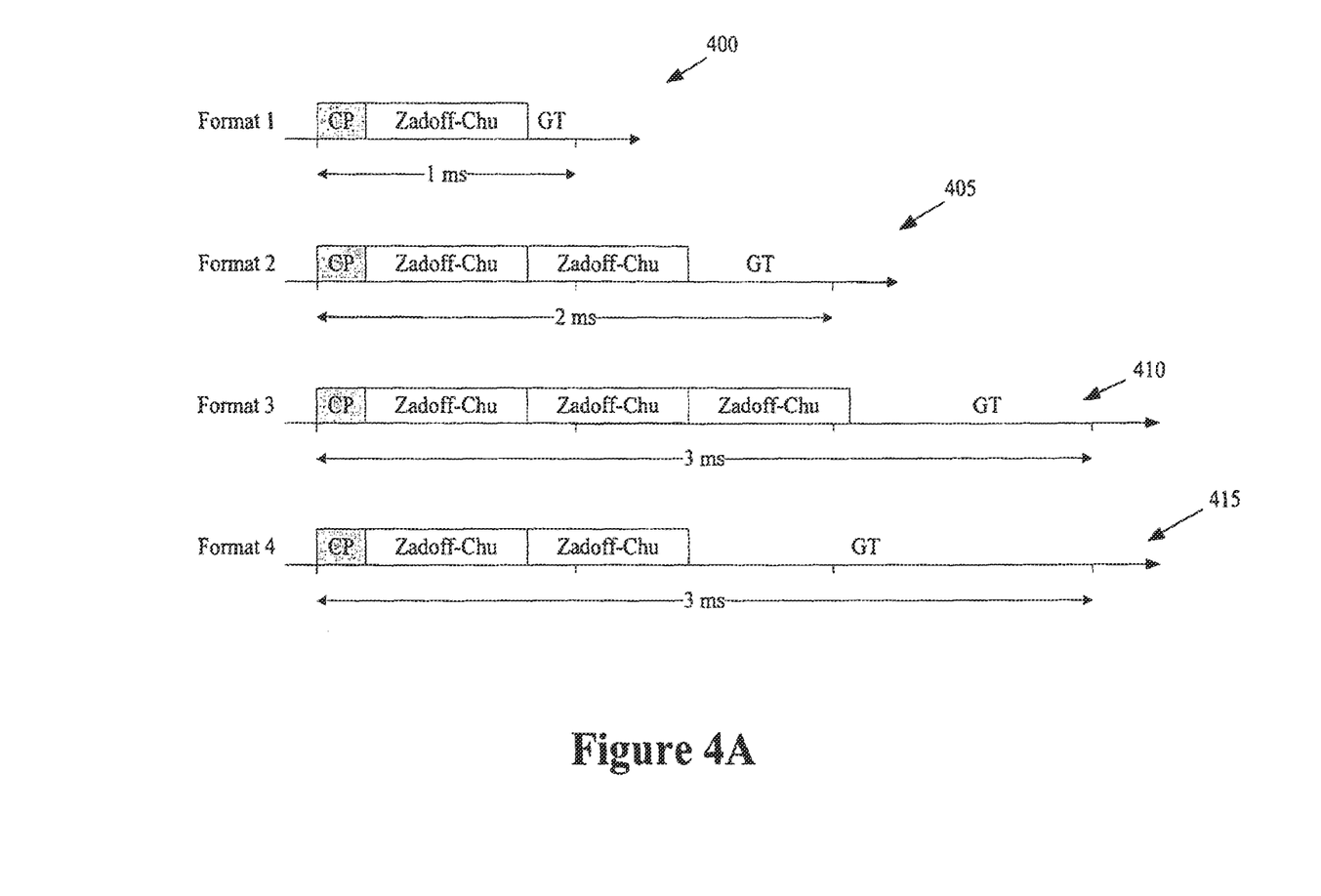
FIG. 4A conceptually illustrates exemplary random access channel burst formats that may be selected by base stations depending on range and/or transmission frequency band, in accordance with the present invention.

FIG. 4A conceptually illustrates exemplary random access channel burst formats that may be selected by base stations depending on range and/or transmission frequency band. Format 400 includes a cyclic prefix (CP), a preamble that is formed using a Zadoff-Chu sequence, and a guard time (GT) interval. The format 400 is transmitted in a single 1 ms subframe. In one embodiment, the format 400 may be used to transmit random access channel bursts intended for base stations that have a range of approximately 15 km. Format 405 includes a cyclic prefix (CP), a preamble that is formed using a Zadoff-Chu sequence, one repetition of the preamble, and a guard time (GT) interval. The format 405 is transmitted in two subframes. The guard time interval in the format 405 is longer than the guard time interval used in the format 400, but the cyclic prefix has the same length. In one embodiment, the format 405 may be used to transmit random access channel bursts intended for base stations that have a range of approximately 45 km.

Three subframes are used to transmit the random access channel bursts in the formats 410, 415. Format 410 includes a cyclic prefix (CP), a preamble that is formed using a Zadoff-Chu sequence, two repetitions of the preamble, and a guard time (GT) interval. The guard time interval in the format 410 is longer than the guard time interval used in the format 405, but the cyclic prefix has the same length. In one embodiment, the format 410 may be used to transmit random access channel bursts intended for base stations that have a range of approximately 75 km. Format 415 includes a cyclic prefix (CP), a preamble that is formed using a Zadoff-Chu sequence, one repetition of the preamble, and a guard time (GT) interval. The guard time interval in the format 415 is longer than the guard time interval used in the format 410, but the cyclic prefix has the same length. At least in part because of the relatively long guard time interval, the format 415 may be used to transmit random access channel bursts intended for base stations that have a range of approximately 200 km. Table 1 lists exemplary values of the parameters used to define the random access channel burst formats 400, 405, 410, 415.

TABLE 1

RACH formats and supported cell radius.

| RACH Format | Number of sub-frames | RPF | CP [μsec] | GT [μsec] | Max cell Radius [km] |
| --- | --- | --- | --- | --- | --- |
| Format 1 | 1 | 1 | 102.6 | 97.4 | 14.61 |
| Format 2 | 2 | 2 | 102.6 | 297.4 | 44.61 |
| Format 3 | 3 | 3 | 102.6 | 497.4 | 74.61 |
| Format 4 | 3 | 2 | 102.6 | 1297.4 | 194.61 |

Figure 4B:
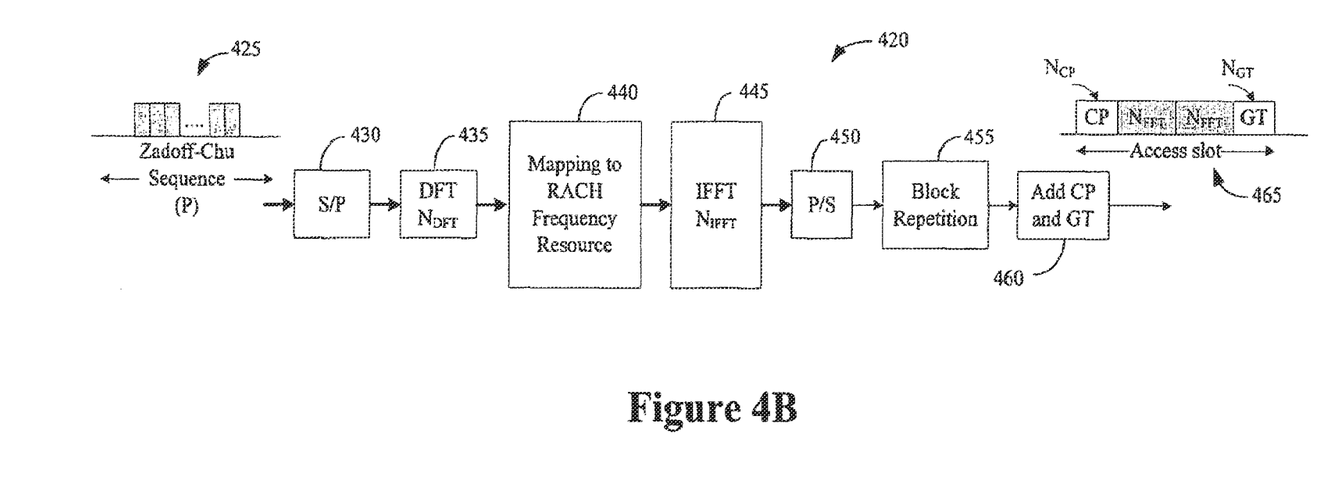
FIG. 4B conceptually illustrates one exemplary embodiment of a transmitter for transmitting random access channel bursts, in accordance with the present invention.

FIG. 4B conceptually illustrates one exemplary embodiment of a transmitter 420 for transmitting random access channel bursts. In the illustrated embodiment, a basic Constant Amplitude Zero Auto Correlation (CAZAC) sequence 425 of length P is generated. A Zadoff-Chu sequence $c_p(n)$ of length P is generated as $$c_p(n) = \begin{cases} \exp\left[\frac{j2\pi p}{P}\left(n + \frac{n(n+1)}{2}\right)\right] & \text{for } P \text{ odd} \\ \exp\left[\frac{j2\pi p}{P}\left(n + \frac{n^2}{2}\right)\right] & \text{for } P \text{ even} \end{cases}$$

By selecting different values for p, different root Zadoff-Chu sequences 425 can be generated. The number of sequences 425 is (P−1) for a prime number P. Orthogonal Zadoff-Chu sequences 425 can be generated by a cyclic shift operation of each of the root Zadoff-Chu sequences. The sequence 425 may be converted from serial stream to parallel stream by an S/P converter 430 and transformed to the frequency domain by a discrete Fourier transform (DFT) of length $N_{DFT}$ using a Fourier transform element 435. The frequency domain signal is mapped to the RACH resources within the entire signal frequency band using a mapper 440. For example, 1.08 MHz bandwidth may be used for RACH transmission out of 1.25 MHz system bandwidth. The unused sub-carriers are set to zeros. The frequency domain signal is converted back to time-domain by an inverse fast Fourier transform (IFFT) of size $N_{FFT}$ using an inverse transformer 445. The output of the IFFT is parallel to serial converted by a P/S converter 450. The signal is repeated block-by-block by the configured repetition factor RPF in a block repetition element 455 to generate a repeated sequence of length ($N_{FFT}$×RPF). Then, CP samples and GT are added by a summer 460 to from an output signal 465 that may be transmitted in one or more access slots.

Figure 4C:
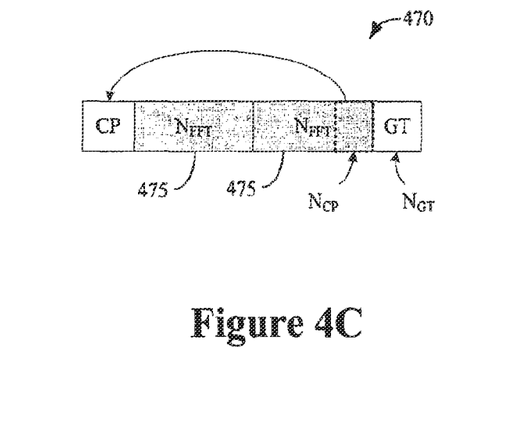
FIG. 4C conceptually illustrates generation of a cyclic prefix for one exemplary random access channel burst format, in accordance with the present invention.

FIG. 4C conceptually illustrates generation of a cyclic prefix (CP) for one exemplary random access channel burst format. In the illustrated embodiment, the exemplary random access channel burst 470 includes two copies of the preamble 475 of length $N_{FFT}$. The cyclic prefix has a length of $N_{CP}$ and the guard time interval (GT) has a length of $N_{GT}$. The cyclic prefix may then be formed by selecting $N_{CP}$ symbols from the end of one copy of the preamble 475 and then using these symbols to form the cyclic prefix.

Figure 5:
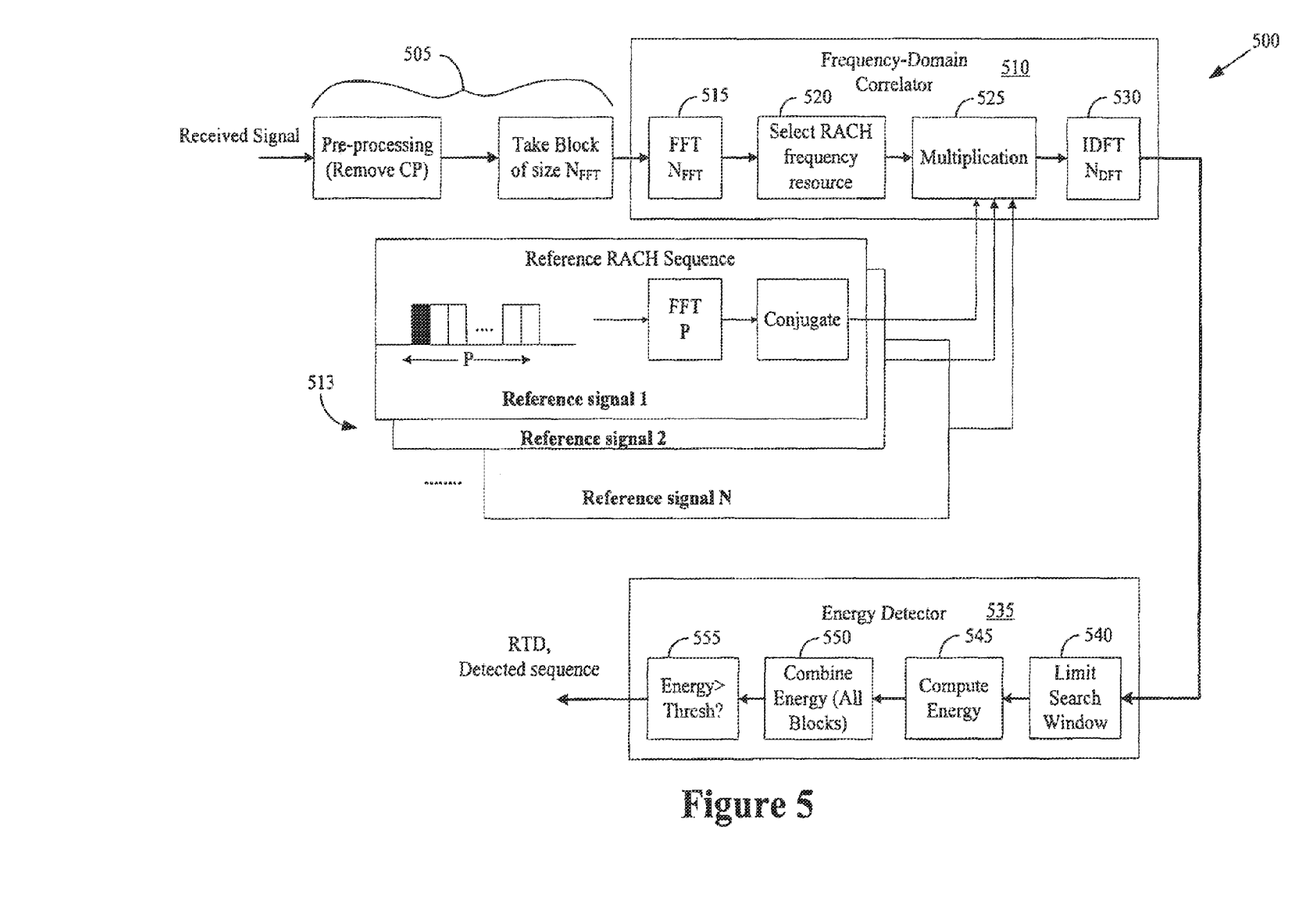
FIG. 5 conceptually illustrates one exemplary embodiment of a receiver, in accordance with the present invention.

FIG. 5 conceptually illustrates one exemplary embodiment of a receiver 500. In the illustrated embodiment, the receiver 500 is a part of a base station (not shown). However, persons of ordinary skill in the art having benefit of the present disclosure should appreciate that the present invention is not limited to receivers 500 that are implemented in base stations. In alternative embodiments, the receiver 500 may be implemented in any device used to provide wireless connectivity to one or more mobile units over an air interface. Exemplary devices include, but are not limited to, access points, access serving networks, access networks, and base station routers. The receiver 500 may implement multiple processing threads that are used to process and/or analyze accumulated signal energy to detect messages provided by mobile units. The processing threads in the receiver 500 may function independently and/or concurrently to analyze portions of the received signal energy, i.e., the processing threads may operate in parallel. Persons of ordinary skill in the art having benefit of the present disclosure should appreciate that the processing threads may be implemented in a single physical processor, such as a central processing unit, that supports multiple threads or in multiple physical processors.

In the illustrated embodiment, the receiver 500 receives signals including the random access channel bursts transmitted by mobile units. The receiver 500 includes a pre-processor 505 that may remove a cyclic prefix from the received signal. The pre-processor 505 may also select and take a portion (or portions) of the signal of a selected length from the RACH burst prior to correlating the processed preambles in the frequency domain correlator. The length of the portion may be selected to correspond to the number of samples $N_{FFT}$ of a fast Fourier transform of the portion of the signal corresponding to a preamble. For example, the FFT size may correspond to the preamble length plus the round-trip delay for the target search window size. The pre-processed signal may then be transmitted to a frequency domain correlator 510 that is configured to process preambles using a plurality of reference signals 513 in a frequency domain. The reference signals 513 may correspond to different RACH sequences that may be found in preambles of RACH bursts. The frequency domain correlator 510 may produce a set of frequency domain correlated outputs for each of the plurality of reference signals 513.

The embodiment of the frequency domain correlator 510 shown in FIG. 5 includes a sequential searcher that operates with a search window size selected dependent upon an estimate of round trip delay. In one embodiment, a sequential search in increments of 14.61 km is used. In the first pass, search is done for a round trip delay (RTD) corresponding to distances from 0 to 14.61 km. In the second pass, search is done for 14.61-29.22 km. The sequential search is done up the RTD corresponding to the GT. The frequency domain correlator 510 also includes a fast Fourier transformer (FFT) 515 for transforming the pre-processed preamble from a time domain to a frequency domain and producing an FFT output including parallel streams of frequency domain signals. The FFT output may be passed to a RACH selector 520 for selecting one or more parallel streams of frequency domain signals from the FFT output corresponding to a RACH and producing a RACH selector output. The signal is then transmitted to a multiplier 525 for multiplying the RACH selector output with one or more of the reference signals to produce multiplier output(s) that include parallel streams of multiplied signals corresponding to the different reference signals. An inverse discrete Fourier transformer (IDFT) 530 may then be used to transform the multiplier output from the frequency domain to a code domain and produce a frequency domain correlated output for the reference signal.

An energy detector 535 may be used to detect the RACH burst sequence by comparing energies associated with the frequency domain correlated outputs to a threshold energy value. For example, the frequency domain correlated outputs may correspond to the energy associated with a portion of a signal that may correspond to one or more preambles in a RACH burst. The energy detector 535 may therefore add or sum the energy associated with each of the frequency domain correlated outputs. If these outputs correspond to the preamble, then the sum of the energies in these outputs should exceed a selected threshold. In the illustrated embodiment, the energy detector 535 includes a search window limiter 540 for limiting the frequency domain correlated output to a selected search window size to produce a limited output. For example, the search window size may be selected to correspond to a cell radius or a range of cell radii. The energy detector 535 may also include an energy module 545 for determining an energy of the limited output and an energy combiner 550 for summing the energy associated with different outputs, which may correspond to repetitions of the preamble in a RACH burst. The energy detector 535 may also include a threshold module 555 for comparing the energy value to a threshold energy value.

Figure 6A:
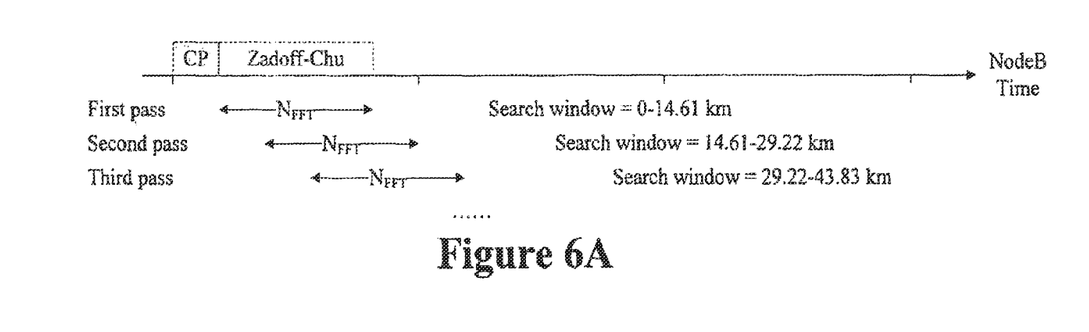
FIGS. 6A and 6B conceptually illustrate random access channel burst detection sequences for two random access channel burst formats, in accordance with the present invention.
Figure 6B:
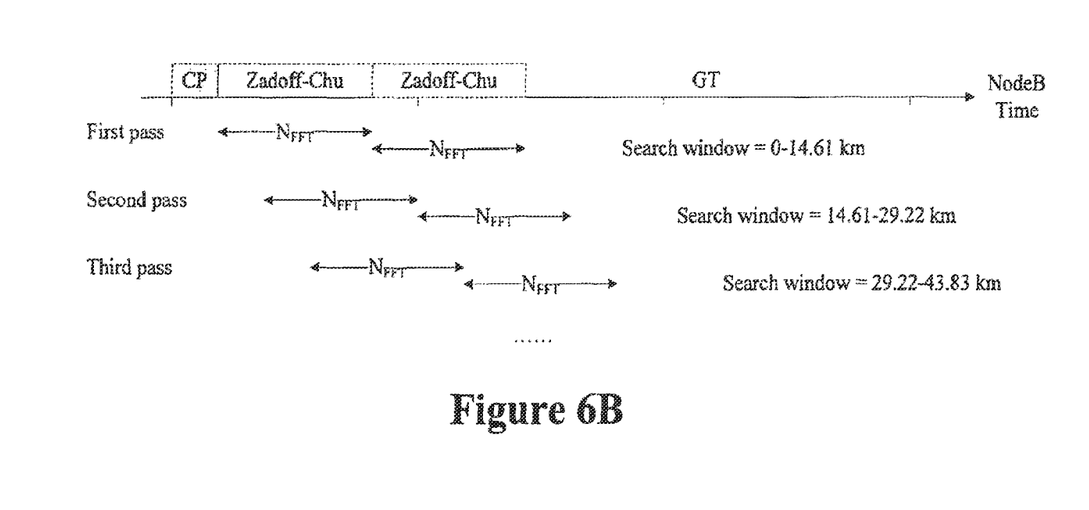

FIGS. 6A and 6B conceptually illustrate random access channel burst detection sequences for two random access channel burst formats. FIG. 6A depicts a random access channel burst detection sequence for a random access channel burst format including a cyclic prefix and a preamble. In the illustrated random access channel burst detection sequence, a receiver makes a first pass in which a received signal is searched over a search window corresponding to a range of cell radii from 0 km to about 15 km. The search window for the first pass is delayed by a time corresponding to the duration of the cyclic prefix and extends for a time corresponding to the duration of the preamble, which in this case is a Zadoff-Chu sequence. The receiver may then make a second pass in which the received signal is searched over a search window corresponding to a range of cell radii from about 15 km to about 30 km. The search window for the second pass is delayed by a time corresponding to twice the duration of the cyclic prefix and extends for a time corresponding to the duration of the preamble. The third pass searches over a search window corresponding to a range of cell radii from about 30 km to about 45 km. The search window for the third pass is delayed by a time corresponding to three times the duration of the cyclic prefix and extends for a time corresponding to the duration of the preamble. Although three passes are depicted in FIG. 6A persons of ordinary skill in the art having benefit of the present disclosure should appreciate that the present invention is not limited to this number of passes and in alternative embodiments any number of passes may be performed.

FIG. 6B depicts a random access channel burst detection sequence for a random access channel burst format including a cyclic prefix, a preamble, and one repetition of the preamble. In the illustrated random access channel burst detection sequence, a receiver makes a first pass in which a received signal is searched over two approximately contiguous or adjacent search windows corresponding to a range of cell radii from 0 km to about 15 km. The first search window for the first pass is delayed by time corresponding to the duration of the cyclic prefix and the second search window for the first pass is delayed by the duration of the cyclic prefix plus the duration of the first search window. The receiver accumulates energy during the first and second search windows. Since the sequences in the preamble and the repetition of the preamble are the same, the energy accumulated during the first and second search windows adds constructively. The receiver may then combine the energy detected during the first and second search windows to determine whether or not the preamble of a random access channel burst has been detected.

The receiver may also make second and third passes in which the received signal is searched over two approximately contiguous or adjacent search windows corresponding to cell radii ranging from 15 km to about 30 km and two approximately contiguous or adjacent search windows corresponding to cell radii ranging from about 30 km to about 45 km. The first search window for each pass is delayed by times corresponding to twice and three times the duration of the cyclic prefix, respectively. The second search window for each pass is delayed by twice and three times the duration of the cyclic prefix, respectively, plus the duration of the first search window. The receiver accumulates energy during the first and second search windows for each pass and combines the energy detected during the first and second search windows. If the accumulated energy in the first and second search windows of either pass exceeds a threshold, then the receiver determines that preamble of a random access channel burst has been detected.

Figure 7:
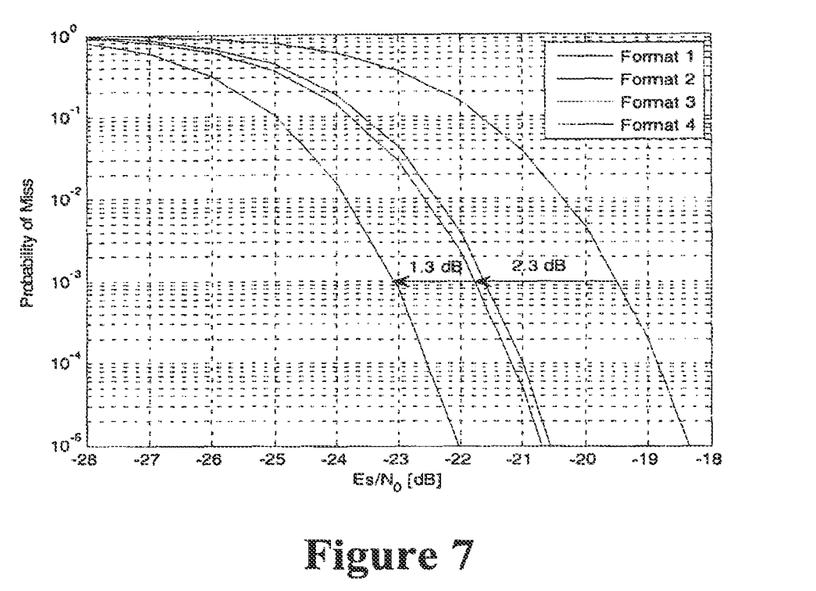
FIG. 7 illustrates theoretical detection performance for an AWGN channel for the random access channel burst formats shown in FIG. 4, in accordance with the present invention.

The detection performance for the four preamble formats discussed above has been analyzed. Theoretical detection performance for AWGN channel is shown in FIG. 7. The number of signatures is 64 and the search window size corresponds to maximum round trip delay (RTD) for the cell. The false alarm probability is assumed to be $P_{FA}=0.1\%$ for all signatures and the entire delay hypothesis is adopted. As shown in FIG. 7, at miss detection probability $P_M=0.1\%$, detection performance improves by 2.3 dB by increasing the RPF from 1 to 2, and by 1.3 dB by further increasing the RPF to 3. Table 2 shows the summary of required Es/N0 for all RACH formats for static channel and TU channel. For TU channel, a 5.5 dB margin may be added to get required Es/N0.

TABLE 2

Required $E_s/N_0$ ($P_{FA} = 0.1\%$, $P_M = 0.1\%$).

| RACH Format | Number of sub-frames | RPF | $E_s/N_0$ for static channel [dB] | Estimated $E_s/N_0$ for TU 3 kmph [dB] |
|---|---|---|---|---|
| Format 1 | 1 | 1 | −19.5 | −14.0 |
| Format 2 | 2 | 2 | −21.8 | −16.3 |
| Format 3 | 3 | 3 | −23.1 | −17.6 |
| Format 4 | 3 | 2 | −21.7 | −16.2 |

A link-budget analysis may be performed using the extended COST-231 Okumura-Hata suburban path loss model. In the Okumura-Hata model, the path loss is modeled as $$PL = 46.3 + 33.9 \log f_C - 13.82 \log h_b - a(h_m) + (44.9 - 6.55 \log h_b) \log d + C$$

where:

$$a(h_m) = (1.1 \log f_C - 0.7) h_m - (1.56 \log f_C - 0.8)$$

$f_C$: carrier frequency in MHz
$h_b$: Node-B antenna height in m
$h_m$: UE antenna height in meters in m
d: distance between Node-B and UE in km.
C: constant factor. C=0 dB for medium-sized cities and suburban areas and C=3 dB for metropolitan areas.
System parameters used in link-budget analysis are shown in Table B.

TABLE B

System parameters for link-budget analysis

| Parameter | Assumption |
|---|---|
| Carrier frequency | 2.1 GHz/900 MHz |
| Distance-dependent path loss | Extended COST 231 Okumura-HATA model (suburban) |
| Node-B receiver antenna gain | 20 dBi |
| Base station antenna height $h_b$ | 30/60/90 m |
| UE antenna height $h_m$ | 1.5 m |
| UE power class | 24 dBm (250 mW). |
| Noise Figure | 5 dB |
| Thermal noise PSD | −174 dBm/Hz |
| Total effective noise PSD | −169 dBm/Hz |
| Shadow fade margin | 0 dB |
| Losses (cable loss, body loss, etc.) | 0 dB |
| IoT | 0 dB |

Figure 8:
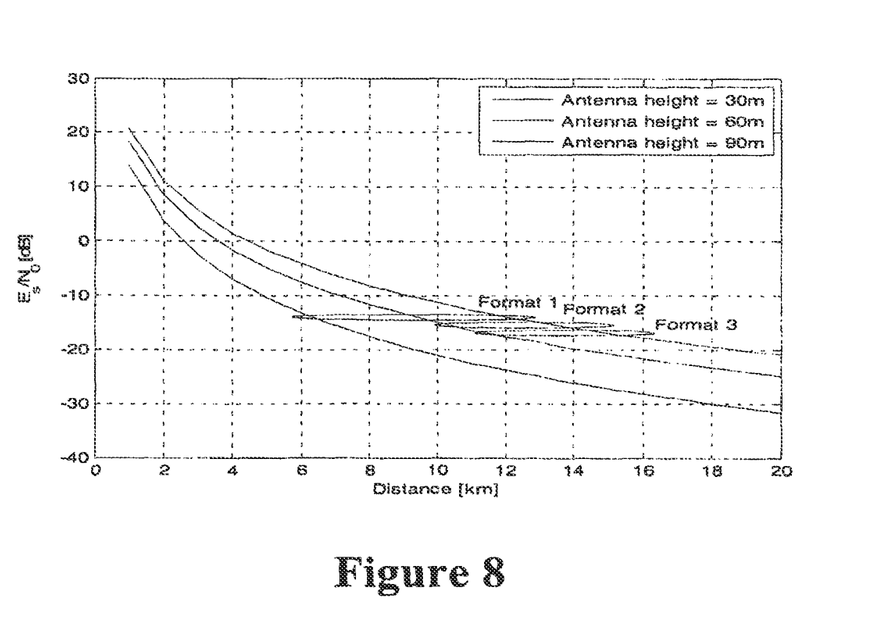
FIGS. 8 and 9 illustrate the required $E_s/N_0$ as a function of the distance between a Node-B and user equipment for base station antenna heights 30 m, 90 m, and 90 m, in accordance with the present invention.
Figure 9:
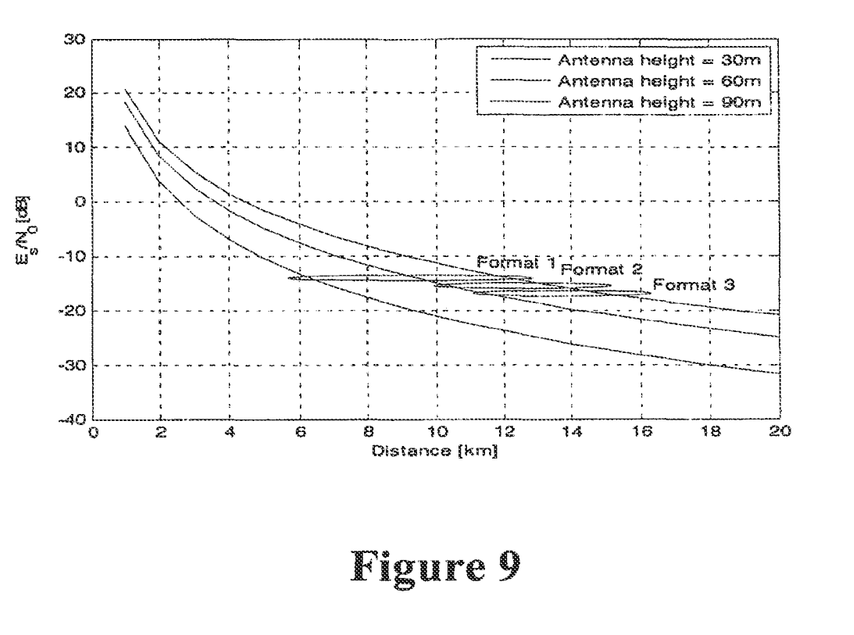

Using this path loss model, the $Es/N_0$ at the antenna connector is obtained as $$Es/N_0 = PL - P_{noise} - IoT + P_{max} - P_{other} + G_{NB} + G_{UE}$$

where PL denotes the propagation loss, $P_{noise}$ denotes the equivalent noise power, IoT is the interference over thermal, $P_{max}$ is UE maximum transmit power, $P_{other}$ is other losses, and $G_{NB}$ and $G_{UE}$ denote the NodeB and UE antenna gain. For thermal noise PSD of −174 dBm/Hz and uplink noise figure of 5 dB, the total effective noise PSD is −169 dBm/Hz. The noise power for RACH bandwidth of 1.08 MHz is obtained as −108.7 dBm. The values of IoT and other losses are assumed to be negligible. FIGS. 8 and 9 show the $Es/N_0$ vs the distance between NodeB and UE for base station antenna heights 30 m, 90 m, and 90 m. FIG. 8 is for carrier frequency 2.1 GHz. For 2.1 GHz carrier frequency, it is possible to cover the radius up to 12 km with RACH Format 1 and up to 14 km with RACH Format 2 for 90 m antenna height. By relaxing the $P_{FA}$ requirements or in benign channel conditions, coverage can be further extended. $Es/N_0$ for carrier frequency 900 MHz is shown in FIG. 9. Coverage for Formats 1 and 2 are 30 km and 38 km, respectively. Based on these observations, it is not always necessary to extend the preamble length for large cell operation.

The flexible RACH structure discussed herein may be used for range extension. The proposed structure uses fixed-length CP and a configurable number of sub-frames and preamble repetition factors. The proposed structure reduces the CP overhead for extended RACH and allows larger search window sizes. By configuring the number of sub-frames and the repetition factor, one can choose a RACH structure for a wide range of deployment scenarios. Cell based RACH structure configuration may also be used to simplify configuration so that mobile units in the same cell may be configured with the same RACH structure. The flexible RACH structure discussed herein may allow transmission of RACH structure with minimal cyclic prefix (CP) overhead. This increases the maximum cell size significantly. For example, the possible cell size for 2-subframe RACH structure is extended to 45 km, rather than 30 km, while having the same detection performance. This scheme allows the operator to configure the RACH structure optimally, depending on radio conditions and deployment scenario. In certain deployment scenarios, repeaters may be used for large cell operation. Also, there are deployment scenarios with remote radio heads. In these scenarios, RACH structure requires longer GT to cover large RTD, but it does not require preamble extension. In such cases, longer RACH structure without preamble repetition may be used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method, comprising:
   generating, at user equipment in a cell, a random access channel burst comprising a cyclic prefix, a preamble, and a number of repetitions of the preamble, wherein the cyclic prefix has a predetermined duration that is independent of the number of repetitions of the preamble, and wherein the number of repetitions of the preamble is indicated in a broadcast message that was received by the user equipment, and wherein any user equipment in the cell that receives the broadcast message uses the number of repetitions of the preamble for generating random access channel bursts; and
   transmitting, from the user equipment, the random access channel burst over an air interface.

2. The method of claim 1, wherein generating the random access channel burst comprises generating a random access channel burst comprising a larger number of repetitions of the preamble when a cell radius of a base station that receives the random access channel burst is larger and a smaller number of repetitions when the cell radius is smaller.

3. The method of claim 1, comprising receiving the broadcast message comprising information indicative of the number of repetitions over at least one broadcast channel.

4. The method of claim 1, wherein transmitting the random access channel burst comprises transmitting the random access channel burst during a number of subframes.

5. The method of claim 4, wherein transmitting the random access channel burst during the number of subframes comprises transmitting the random access channel burst during a number of subframes selected based upon the number of repetitions of the preamble and a guard time interval.

6. The method of claim 5, wherein transmitting the random access channel burst comprises transmitting the random access channel burst during the number of subframes selected based upon the selected number of repetitions of the preamble and the guard time interval that is selected based upon at least one of a cell radius and a radio transmission frequency.

7. The method of claim 1, wherein the number of repetitions of the preamble is selected based upon at least one of a cell radius and a radio transmission frequency.

8. The method of claim 1, wherein the number of repetitions of the preamble is zero, one, or two.

9. The method of claim 1, wherein the steps of generating and transmitting are performed by user equipment.

10. The method of claim 1, wherein the number of repetitions is independent of a distance between the user equipment and a base station that determines the number of repetitions.

11. User equipment, comprising:
means for generating, at user equipment in a cell, a random access channel burst comprising a cyclic prefix, a preamble, and a number of repetitions of the preamble, wherein the cyclic prefix has a predetermined duration that is independent of the number of repetitions of the preamble, and wherein the number of repetitions of the preamble is indicated in a broadcast message received by the user equipment, and wherein any user equipment in the cell that receives the broadcast message uses the number of repetitions of the preamble for generating random access channel bursts; and
means for transmitting, from the user equipment, the random access channel burst over an air interface.

12. The user equipment of claim 11, wherein the number of repetitions of the preamble is zero, one, or two.

13. The user equipment of claim 11, wherein the number of repetitions is independent of a distance between the user equipment and a base station that determines the number of repetitions.

14. User equipment comprising:
at least one processor to generate a random access channel burst comprising a cyclic prefix, a preamble, and a number of repetitions of the preamble, wherein the cyclic prefix has a predetermined duration that is independent of the number of repetitions of the preamble, and wherein the number of repetitions of the preamble is indicated in a broadcast message received by the user equipment in a cell, and wherein any user equipment in the cell that receives the broadcast message uses the number of repetitions of the preamble for generating random access channel bursts; and
a transmitter to transmit the random access channel burst over an air interface.

15. The user equipment of claim 14, wherein the number of repetitions of the preamble is zero, one, or two.

16. The user equipment of claim 14, wherein the user equipment is further configured to:
generate a first random access channel burst having a first format comprising a first cyclic prefix that has a first length, the preamble having a second length, and a first number of repetitions of the preamble, wherein the first number of repetitions of the preamble is indicated in a first broadcast message received by the user equipment in a first cell, and wherein any of the other user equipment in the first cell that receives the first broadcast message uses the first number of repetitions of the preamble for generating random access channel bursts;
receive a second broadcast message indicating a second format for the random access channel bursts; and
generate a second random access channel burst in response to receiving the second broadcast message, wherein the second random access channel burst has the second format comprising a second cyclic prefix having the first length, a second preamble having the second length, and a second number of repetitions of the second preamble, the second number being different from the first number, wherein the second number of repetitions of the preamble is indicated in the second broadcast message received by the user equipment in a second cell, and wherein any of the other user equipment in the second cell that receives the second broadcast message uses the second number of repetitions of the preamble for generating random access channel bursts.

17. The user equipment of claim 14, further comprising:
a block repetition element configured to generate a sequence having the preamble and the first number of repetitions of the preamble; and
a summer configured to form the random access channel burst comprising the sequence and a cyclic prefix, wherein the cyclic prefix has a predetermined duration that is independent of the number of repetitions of the preamble.

18. The user equipment of claim 17, wherein the block repetition element is configured to generate the sequence by performing a block-by-block repetition of the preamble.

19. The user equipment of claim 17, wherein the user equipment is configured to generate preambles comprising constant amplitude zero autocorrelation sequences that can be provided to the block repetition element.

20. The user equipment of claim 17, wherein the summer is configured to form the random access channel burst comprising the sequence, the cyclic prefix, and a guard time interval.

21. The user equipment of claim 14, wherein the first number of repetitions is independent of a distance between the user equipment and a base station that determines the first number of repetitions.

22. The user equipment of claim 14, wherein the transmitter is coupled to an antenna.

23. A method, comprising:
broadcasting, from a base station in a cell, a broadcast message indicating a number of repetitions of a preamble, wherein any user equipment in the cell that receives the broadcast message uses the number of repetitions of the preamble for generating random access channel bursts;
detecting, at the base station, a random access channel burst comprising a cyclic prefix, a preamble, and the number of repetitions of the preamble indicated in the broadcast message, wherein the cyclic prefix has a predetermined duration that is independent of the number of repetitions of the preamble.

24. The method of claim 23, comprising selecting zero, one, or two repetitions of the preamble.

25. The method of claim 23, comprising selecting the number of repetitions based on a cell radius of the base station that receives the signal.

26. The method of claim 25, wherein selecting the number of repetitions comprises selecting a larger number of repetitions of the preamble when the cell radius is larger and a smaller number of repetitions when the cell radius is smaller.

27. The method of claim 23, comprising selecting the number of repetitions based on a radio transmission frequency used to transmit the signal.

28. The method of claim 27, wherein selecting the number of repetitions comprises selecting a larger number of repetitions of the preamble when the radio transmission frequency is higher and a smaller number of repetitions of the preamble when the radio transmission frequency is lower.

29. The method of claim 23, wherein the number of repetitions is independent of a distance between the user equipment and the base station that determines the number of repetitions.

30. The method of claim 23, wherein detecting the random access channel burst comprises searching for the random access channel burst in a signal received during a number of subframes.

31. The method of claim 30, comprising selecting the number of subframes based upon the number of repetitions of the preamble and a guard time interval.

32. The method of claim 31, comprising selecting the guard time interval based upon at least one of a cell radius and a radio transmission frequency.

33. The method of claim 23, wherein detecting the random access channel burst comprises accumulating energy from a signal received during a plurality of search windows that are delayed relative to each other by an offset determined based on a cell radius.

34. The method of claim 33, wherein accumulating the energy from the signal comprises accumulating energy from the signal for a number of time periods associated with each of the search windows, the number of time periods corresponding to the number of repetitions of the preamble plus one.

35. The method of claim 34, wherein detecting the random access channel burst comprises combining the energy accumulated during the number of time periods.

36. The method of claim 35, wherein detecting the random access channel burst comprises determining that the random access channel burst has been detected when the energy accumulated during the number of time periods associated with one of the search windows exceeds a threshold.

37. The method of claim 23, wherein the steps of broadcasting and detecting are performed by a base station.

38. An apparatus, comprising:
means for broadcasting, from a base station in a cell, a broadcast message indicating a number of repetitions of a preamble, wherein any user equipment in the cell that receives the broadcast message uses the number of repetitions of the preamble for generating random access channel bursts;
means for detecting, at the base station, a random access channel burst comprising a cyclic prefix, a preamble, and the number of repetitions of the preamble indicated in the broadcast message, wherein the cyclic prefix has a predetermined duration that is independent of the number of repetitions of the preamble.

39. The apparatus of claim 38, wherein the number of repetitions of the preamble is zero, one, or two.

40. The apparatus of claim 38, wherein the number of repetitions is independent of a distance between the user equipment and a base station that determines the number of repetitions.

41. A base station comprising:
at least one processor to cause the base station to broadcast, into a cell, a broadcast message indicating a number of repetitions of a preamble, wherein any user equipment in the cell that receives the broadcast message uses the number of repetitions of the preamble for generating random access channel bursts;
a receiver to detect a random access channel burst comprising a cyclic prefix, a preamble, and the number of repetitions of the preamble indicated in the broadcast message, wherein the cyclic prefix has a predetermined duration that is independent of the number of repetitions of the preamble.

42. The base station of claim 41, wherein the number of repetitions is zero, one, or two.

43. The base station of claim 41, wherein the number of repetitions is independent of a distance between the user equipment and the receiver.

44. The base station of claim 41, further comprising:
a pre-processor configured to remove a cyclic prefix from the random access channel burst; and
a frequency domain correlator configured to receive signals from the pre-processor.

45. The base station of claim 44, wherein the frequency domain correlator is configured to search a number of adjacent search windows for the random access channel burst, wherein the number of adjacent search windows is equal to the number of repetitions of the preamble plus one.

46. The base station of claim 45, wherein the frequency domain correlator delays adjacent search windows by a time corresponding to the predetermined duration of the cyclic prefix.

47. The base station of claim 45, wherein the frequency domain correlator is configured to search the number of adjacent search windows in a plurality of passes, each pass corresponding to a different range, and wherein each pass is offset in time from the previous pass by the predetermined duration of the cyclic prefix.

48. The base station of claim 45, comprising an energy detector that combines energy accumulated in the adjacent search windows and compares the accumulated energy to a threshold to determine whether the random access channel burst has been detected.

49. The base station of claim 48, wherein the energy detector comprises a search window limiter to limit the frequency domain correlated output to a search window size.

50. The base station of claim 49, wherein the search window limiter is configured to limit the frequency domain correlated output to a search window size corresponding to a cell radius or a range of cell radii.

51. The base station of claim 48, wherein the energy detector comprises an energy combiner for summing the energy associated with different outputs that correspond to repetitions of the preamble in the random access channel burst.

52. The base station of claim 41, wherein the receiver is coupled to an antenna.

53. A method, comprising:
transmitting, from user equipment in a first cell, a first random access channel burst comprising a cyclic prefix, a preamble, and a first number of repetitions of the preamble, wherein the cyclic prefix has a predetermined duration that is independent of the first number of repetitions of the preamble, and wherein the first number of repetitions of the preamble is indicated in a first broadcast message received by the user equipment, and wherein any user equipment in the first cell that receives the first broadcast message uses the first number of repetitions of the preamble for generating random access channel bursts;
receiving, at the user equipment in a second cell, a second broadcast message indicating a second number of repetitions of the preamble that differs from the first number of repetitions of the preamble, wherein any user equipment in the second cell that receives the second broadcast message uses the second number of repetitions of the preamble for generating random access channel bursts; and
transmitting, from the user equipment, a second random access channel burst comprising the cyclic prefix, the preamble, and the second number of repetitions of the preamble.

54. The method of claim 53, wherein the first number of repetitions is zero, one, or two.

55. The method of claim 53, wherein the first number of repetitions is independent of a distance between the user terminal and a first base station that determines the first number of repetitions.

56. The method of claim 53, wherein the second number of repetitions is zero, one, or two.

57. The method of claim 53, wherein the second number of repetitions is independent of a distance between the user terminal and a second base station that determines the second number of repetitions.

58. User equipment, comprising:
- means for transmitting a first random access channel burst comprising a cyclic prefix, a preamble, and a first number of repetitions of the preamble, wherein the cyclic prefix has a predetermined duration that is independent of the first number of repetitions of the preamble, and wherein the first number of repetitions of the preamble is indicated in a first broadcast message received by the user equipment in a first cell, and wherein any user equipment in the first cell that receives the first broadcast message uses the first number of repetitions of the preamble for generating random access channel bursts;
- means for receiving a second broadcast message indicating a second number of repetitions of the preamble that differs from the first number of repetitions of the preamble, wherein any user equipment in a second cell that receives the second broadcast message uses the second number of repetitions of the preamble for generating random access channel bursts; and
- means for transmitting a second random access channel burst comprising the cyclic prefix, the preamble, and the second number of repetitions of the preamble.

59. The user equipment of claim 58, wherein the first number of repetitions is zero, one, or two.

60. The user equipment of claim 58, wherein the first number of repetitions is independent of a distance between the user terminal and a first base station that determines the first number of repetitions.

61. The user equipment of claim 58, wherein the second number of repetitions is zero, one, or two.

62. The user equipment of claim 58, wherein the second number of repetitions is independent of a distance between the user terminal and a second base station that determines the second number of repetitions.

63. User equipment comprising:
- a transmitter to transmit a first random access channel burst comprising a cyclic prefix, a preamble, and a first number of repetitions of the preamble, wherein the cyclic prefix has a predetermined duration that is independent of the first number of repetitions of the preamble, and wherein the first number of repetitions of the preamble is indicated in a first broadcast message received by the user equipment in a first cell, and wherein any user equipment in the first cell that receives the first broadcast message uses the first number of repetitions of the preamble for generating random access channel bursts; and
- a receiver to receive a second broadcast message indicating a second number of repetitions of the preamble that differs from the first number of repetitions of the preamble, wherein any user equipment in a second cell that receives the second broadcast message uses the second number of repetitions of the preamble for generating random access channel bursts, and wherein the transmitter is to transmit a second random access channel burst comprising the cyclic prefix, the preamble, and the second number of repetitions of the preamble.

64. The user equipment of claim 63, wherein the first number of repetitions is zero, one, or two.

65. The user equipment of claim 63, wherein the first number of repetitions is independent of a distance between the user terminal and a first base station that determines the first number of repetitions.

66. The user equipment of claim 63, wherein the second number of repetitions is zero, one, or two.

67. The user equipment of claim 63, wherein the second number of repetitions is independent of a distance between the user terminal and a second base station that determines the second number of repetitions.

68. The user equipment of claim 63, wherein at least one of the transmitter and the receiver is coupled to an antenna.

* * * * *